United States Patent [19]

Seo

[11] Patent Number: 5,499,048
[45] Date of Patent: Mar. 12, 1996

[54] MULTI-VIDEO/AUDIO SYSTEM AND METHOD OF CONTROLLING THE SAME

[75] Inventor: Ho I. Seo, Kyoungki-do, Rep. of Korea

[73] Assignee: Hyundai Electronics Industries Co., Ltd., Rep. of Korea

[21] Appl. No.: 312,996

[22] Filed: Sep. 27, 1994

[30] Foreign Application Priority Data

Dec. 29, 1993 [KR] Rep. of Korea .................. 1993-30580

[51] Int. Cl.⁶ ............................... H04N 7/14; H04N 7/16
[52] U.S. Cl. .................... 348/10; 348/3; 348/12; 348/13; 455/5.1; 455/6.3
[58] Field of Search ................... 348/3, 7, 10, 11, 348/12, 13, 16, 553; 455/4.1, 4.2, 5.1, 6.1, 6.2, 6.3, 3.1, 3.2, 3.3; H04N 7/14, 7/16, 7/18

[56] References Cited

U.S. PATENT DOCUMENTS

| | | | |
|---|---|---|---|
| 5,089,885 | 2/1992 | Clark | 348/7 |
| 5,247,575 | 9/1993 | Sprague et al. | 348/3 X |
| 5,285,278 | 2/1994 | Holman | 348/3 X |
| 5,319,454 | 6/1994 | Schutte | 348/7 X |

FOREIGN PATENT DOCUMENTS 5-122695(A) 5/1993 Japan .................. H04N 7/16

Primary Examiner—Victor R. Kostak
Assistant Examiner—John W. Miller
Attorney, Agent, or Firm—Fish & Richardson

[57] ABSTRACT

A multi-video/audio system and a method of controlling the same. The system comprises a CPU for controlling the entire operation of the system, a card input/output unit for ascertaining a card identification number, a card private number and deposit balance of the user and issuing a service receipt for a charged service, a data modem for transmitting/receiving a modem signal of various data information to/from a data base connected to a cable television network, a network interface unit for performing an interfacing operation between the data modem and the cable television network, a television video/audio signal generation circuit for generating television video and audio signals of a selected channel in response to a high frequency signal, an audio signal amplifier for amplifying one of the television audio signal and a compact disk audio signal, a compact disk controller for exchanging a compact disk with another one and loading the exchanged compact disk, a compact disk video/audio signal generation circuit for generating a compact disk video signal and the compact disk audio signal, and a video signal switching circuit for selectively outputting the video signals from the television video/audio signal generation circuit and the compact disk video/audio signal generation circuit to a color monitor.

12 Claims, 7 Drawing Sheets

MULTI-VIDEO/AUDIO SYSTEM AND METHOD OF CONTROLLING THE SAME

BACKGROUND OF THE INVENTION

1. Field of the Invention

The present invention relates to multi-video/audio systems which can be disposed in hotels, department stores, airport terminals and etc. to provide really and variously the user with video information and all-round services including an amusement service, and a method of controlling the same.

2. Description of the Prior Art

Generally, conventional information terminal units provide limited services in that they have a simple data information transfer function depending on digital information. Such a limited function leads the information terminal units not to be widely used.

Such conventional information terminal units are shown in Japanese Patent Laid-open Publication No. Heisei 5-122695. These information terminal units are connected to a cable television (CATV) network to provide various services. In particular, the information terminal units perform accounting processes, which were previously performed by the network, so as to reduce the cost in the network construction due to an increase in the number of the units. However, the conventional information terminal units have the disadvantage that they cannot provide really and variously the user with video information and all-round services including an amusement service.

SUMMARY OF THE INVENTION

Therefore, the present invention has been made in view of the above problem, and it is an object of the present invention to provide a multi-video/audio system which is capable of serving the user with desired video and audio information from a compact disk driver, a CATV network or a private data base connected to the CATV network, and a method of controlling the same.

In accordance with one aspect of the present invention, there is provided a multi-video/audio system comprising system control means for controlling the entire operation of the system; memory means for storing system information necessary to the operation of said system control means, accounting data, a terminal identification number and time; clock generation means for generating a clock signal to said system control means; battery backup means for supplying auxiliary power to said memory means and said clock generation means when the supply of main power thereto is blocked, so that said memory means and said clock generation means can maintain their original functions; card input/output means for ascertaining a card identification number, a card private number and deposit balance of the user in response to a card reader control signal from said system control means and issuing a service receipt in response to a print control signal from said system control means for a charged service; data modem means for transmitting/receiving a modem signal of various data information to/from a data base connected to a cable television network in response to a data modem control signal from said system control means; network interface means for performing an interfacing operation between said data modem means and said cable television network in response to a network interface control signal from said system control means; television video/audio signal generation means for receiving a high frequency signal from said cable television network through said network interface means, selecting one of a plurality of channels corresponding to the received high frequency signal, generating television video and audio signals of the selected channel and separating the generated television video signal into red, green and blue color signals and a synchronous signal to be used in a general color monitor; audio signal amplification means for amplifying one of the television audio signal from said television video/audio signal generation means and a compact disk audio signal and outputting the amplified audio signal to a speaker or a head phone in response to a volume/tone quality control signal and a speaker/head phone switching signal; compact disk control means for exchanging a compact disk with another one in response to a compact disk exchange control signal from said system control means, loading the exchanged compact disk and outputting a compact disk control signal to said system control means; compact disk video/audio signal generation means for extracting red, green and blue color signals and a synchronous signal from video data from said compact disk control means read by said system control means in response to a compact disk video control signal from said system control means, extracting the compact disk audio signal from audio data from said compact disk control means read by said system control means in response to a compact disk audio control signal from said system control means and outputting the extracted compact disk audio signal to said audio signal amplification means; video signal switching means for selectively outputting the red, green and blue color signals and the synchronous signal from said television video/audio signal generation means and the red, green and blue color signals and the synchronous signal from said compact disk video/audio signal generation means to the color monitor; key input means including a key pad for inputting key information selected by the user and a key interface unit for transferring the key information inputted by said key pad to said system control means; and power supply means including a power switch for turning on/off alternating current power and a direct current power supply for receiving the alternating current power through said power switch and supplying direct current power as the main power to said components in the system.

In accordance with another aspect of the present invention, there is provided a method of controlling a multi-video/audio system, comprising the steps of (a) initializing the system when a power switch is turned on; (b) outputting guide information and a sound regarding basic video/audio services; (c) discriminating whether a service desired by the user is charged or free; (d) providing information corresponding to a free service for the user if it is discriminated at said step (c) that the desired service is free and then checking whether the user continues to desire a service if the present service is ended; (e) reading a user's card through a card reader if it is discriminated at said step (c) that the desired service is charged and interfacing a data modem and a cable television network through a network interface unit to transmit and receive a modem signal to/from a data base connected to the cable television network, so as to ascertain a card identification number, a card private number and deposit balance of the user; (f) checking whether the charged service is a compact disk service; (g) performing a compact disk service operation if it is checked at said step (f) that the charged service is the compact disk service; (h) checking whether the charged service is a cable television service if it is checked at said step (f) that the charged service is not the compact disk service; and (i) performing a cable television service operation if it is checked at said step (h) that the charged service is the cable television service.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
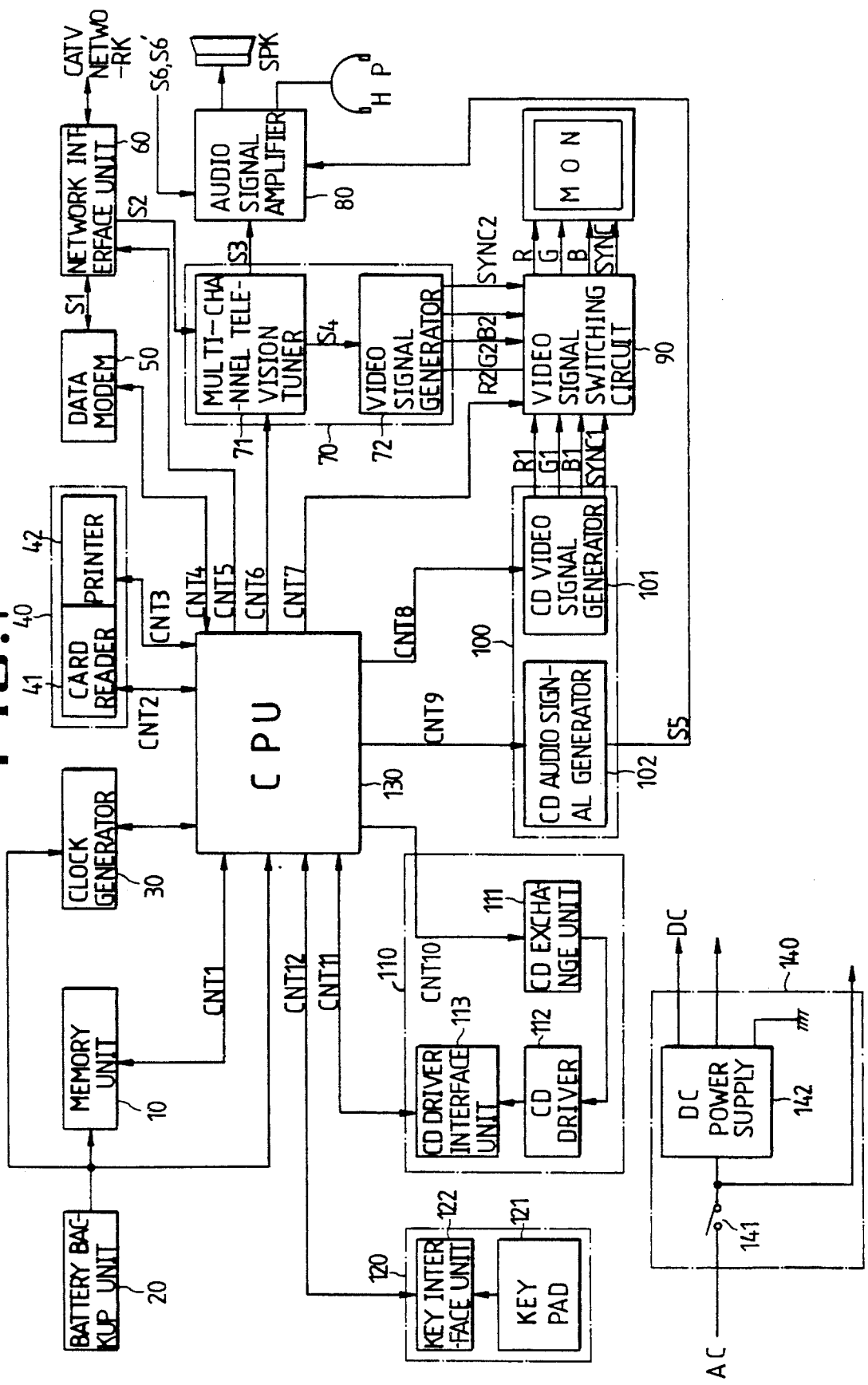
FIG. 1 is a block diagram of a multi-video/audio system in accordance with the present invention.

Referring to FIG. 1, there is shown a block diagram of a multi-video/audio system in accordance with the present invention. As shown in this drawing, the multi-video/audio system comprises a central processing unit (CPU) 130 for controlling the entire operation of the system, a memory unit 10 for storing system information necessary to the operation of the CPU 130, accounting data, a terminal identification number and time, a clock generator 30 for generating a clock signal to the CPU 130, a battery backup unit 20 for supplying auxiliary power to the memory unit 10 and the clock generator 30 when the supply of main power thereto is blocked, so that the memory unit 10 and the clock generator 30 can maintain their original functions, and a card input/output unit 40 for ascertaining a card identification number, a card private number and deposit balance of the user in response to a card reader control signal CNT2 from the CPU 130 and issuing a service receipt in response to a print control signal CNT3 from the CPU 130 for a charged service.

The card input/output unit 40 includes a card reader 41 for ascertaining the card identification number, the card private number and the deposit balance of the user in response to the card reader control signal CNT2 from the CPU 130 and a printer 42 for issuing the service receipt in response to the print control signal CNT3 from the CPU 130.

A data modem 50 is also provided in the multi-video/audio system to transmit/receive a modem signal S1 of various data information to/from a data base connected to a CATV network in response to a data modem control signal CNT4 from the CPU 130. The data modem 50 is the same in construction as an existing high frequency data modem used in the CATV network.

A network interface unit 60 is also provided in the multi-video/audio system to perform an interfacing operation between the data modem 50 and the CATV network in response to a network interface control signal CNT5 from the CPU 130. The network interface unit 60 is the same in construction as an existing one used in the CATV network.

A television video/audio signal generation circuit 70 is also provided in the multi-video/audio system to receive a high frequency signal S2 from the CATV network through the network interface unit 60, select one of a plurality of channels corresponding to the received high frequency signal S2, generate television video and audio signals S4 and S3 of the selected channel and separate the generated television video signal S4 into red, green and blue color signals R2, G2 and B2 and a synchronous signal SYNC2 to be used in a general color monitor MON. The television video/audio signal generation circuit 70 includes a multi-channel television tuner 71 responsive to a tuner control signal CNT6 from the CPU 130 for receiving the high frequency signal S2 from the CATV network through the network interface unit 60, selecting one of the plurality of channels corresponding to the received high frequency signal S2 and generating the television video and audio signals S4 and S3 of the selected channel, and a video signal converter 72 for separating the generated television video signal S4 from the multi-channel television tuner 71 into the red, green and blue color signals R2, G2 and B2 and the synchronous signal SYNC2 to be used in the general color monitor MON.

An audio signal amplifier 80 is also provided in the multi-video/audio system to amplify one of the television audio signal S3 from the multi-channel television tuner 71 and a compact disk (CD) audio signal S5 and output the amplified audio signal to a speaker SPK or a head phone HP in response to a volume/tone quality control signal S6 and a speaker/head phone switching signal S6'.

A CD controller 110 is also provided in the multi-video/audio system to exchange a CD with another one in response to a CD exchange control signal CNT10 from the CPU 130, load the exchanged CD and output a CD control signal CNT11 to the CPU 130. The CD controller 110 includes a CD exchange unit 111 for exchanging the CD with another one in response to the CD exchange control signal CNT10 from the CPU 130, a CD driver 112 for loading the exchanged CD in response to an output signal from the CD exchange unit 111, and a CD driver interface unit 113 for outputting the CD control signal CNT11 to the CPU 130 in response to an output signal from the CD driver 112.

A CD video/audio signal generation circuit 100 is also provided in the multi-video/audio system to extract red, green and blue color signals R1, G1 and B1 and a synchronous signal SYNC1 from video data from the CD driver 112 read by the CPU 130 in response to a CD video control signal CNT8 from the CPU 130, extract the CD audio signal S5 from audio data from the CD driver 112 read by the CPU 130 in response to a CD audio control signal CNT9 from the CPU 130 and output the extracted CD audio signal S5 to the audio signal amplifier 80. The CD video/audio signal generation circuit 100 includes a CD video signal generator 101 for extracting the red, green and blue color signals R1, G1 and B1 and the synchronous signal SYNC1 from the video data from the CD driver 112 read by the CPU 130 in response to the CD video control signal CNT8 from the CPU 130, and a CD audio signal generator 102 for extracting the CD audio signal S5 from the audio data from the CD driver 112 read by the CPU 130 in response to the CD audio control signal CNT9 from the CPU 130 and outputting the extracted CD audio signal S5 to the audio signal amplifier 80.

A video signal switching circuit 90 is also provided in the multi-video/audio system to selectively output the red, green and blue color signals R2, G2 and B2 and the synchronous signal SYNC2 from the video signal converter 72 and the red, green and blue color signals R1, G1 and B1 and the synchronous signal SYNC1 from the CD video signal generator 101 to the color monitor MON.

A key input circuit 120 includes a key pad 121 for inputting key information selected by the user and a key interface unit 122 for transferring the key information inputted by the key pad 121 to the CPU 130.

A power supply circuit 140 includes a power switch 141 for turning on/off alternating current (AC) power and a direct current (DC) power supply 142 for receiving the AC power through the power switch 141 and supplying DC power as the main power to the components in the system.

Figure 2:
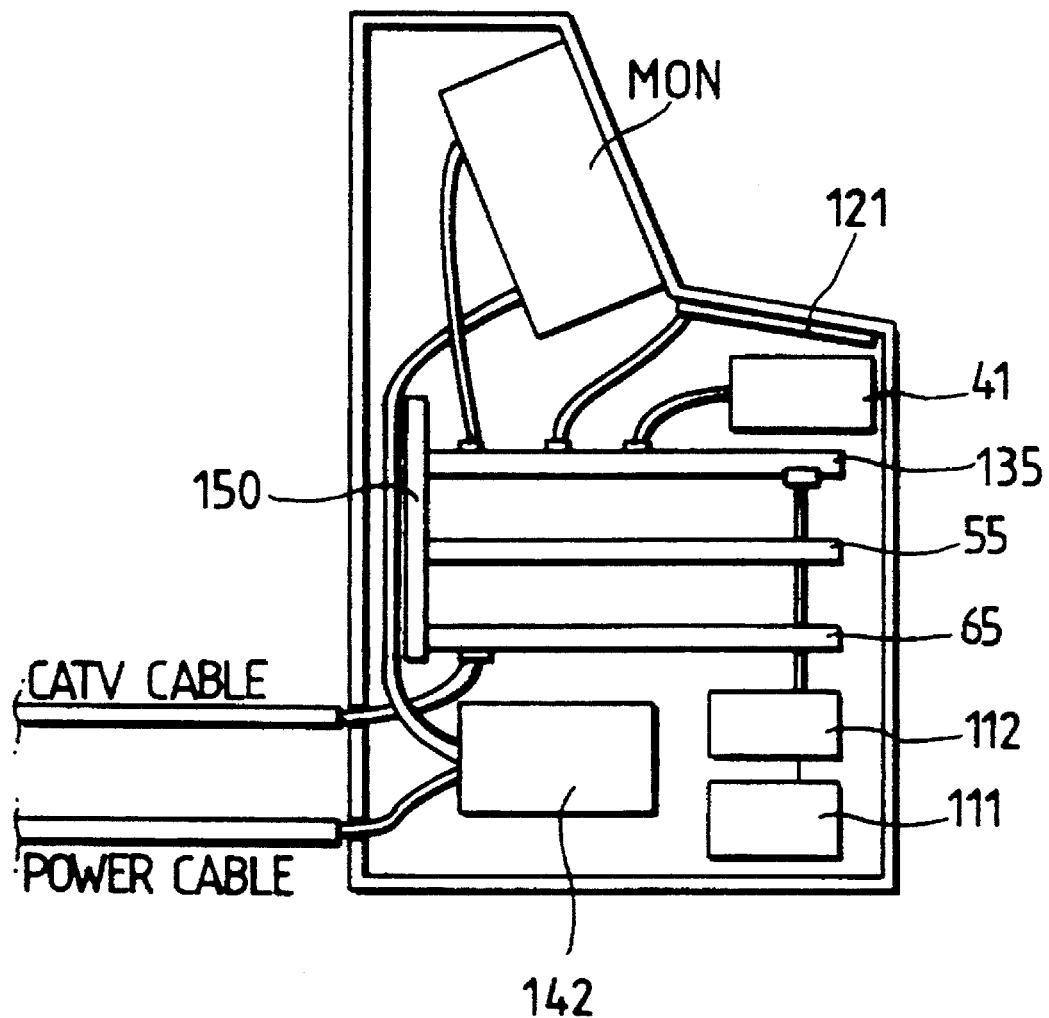
FIG. 2 is a schematic view illustrating an inner construction of the multi-video/audio system in accordance with the present invention.

Referring to FIG. 2, there is shown a schematic view illustrating an inner construction of the multi-video/audio system in accordance with the present invention. In this drawing, the color monitor MON is adapted to display video information selected by the user. As stated previously, the key pad 121 functions to input the key information selected by the user and transfer the inputted key information to the CPU 130. Here, the key information from the key pad 121 is transferred to a main control board 135 of the CPU 130. The card reader 41 is adapted to ascertain the card identification number, the card private number and the deposit balance of the user for the charged service. The data modem 50 is mounted on a data modem board 55. A network interface board 65 is connected to a CATV network cable. A back board 150 is adapted to support the main control board 135, the data modem board 55 and the network interface board 65. As mentioned previously, the CD exchange unit 111 exchanges the CD with one selected by the user and the CD driver 112 loads the CD exchanged by the CD exchange unit 111. The DC power supply 142 receives the AC power through a power cable and supplies the DC power as the main power to the components in the system.

Figure 3:
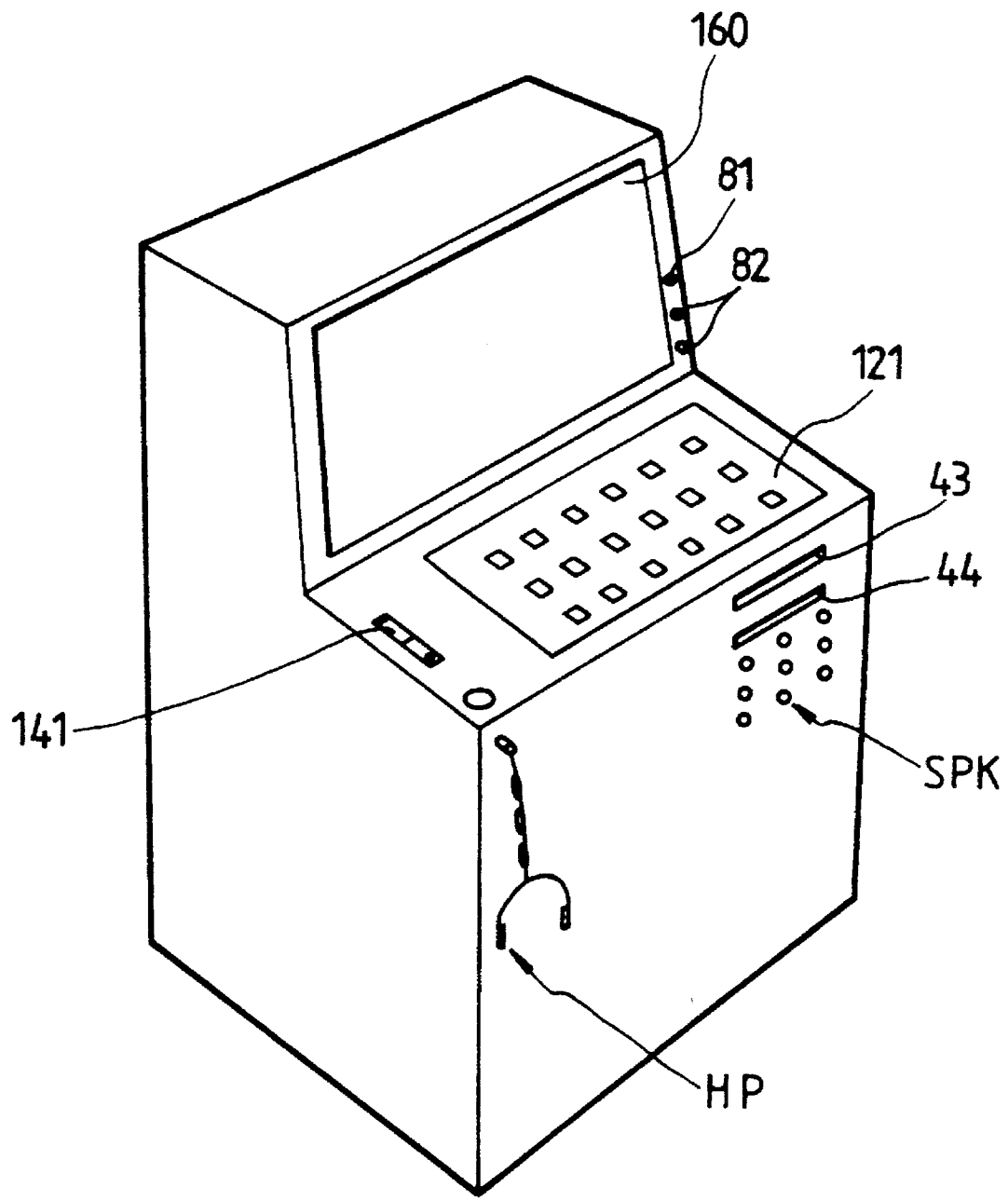
FIG. 3 is a perspective view of the multi-video/audio system in accordance with the present invention.

Referring to FIG. 3, there is shown a perspective view of the multi-video/audio system in accordance with the present invention. In this drawing, a speaker/head phone switch 81 is provided to output the speaker/head phone switching signal S6' to the audio signal amplifier 80. A volume/tone quality controller 82 is provided to output the volume/tone quality control signal S6 to the audio signal amplifier 80. A display screen 160 is adapted to display the video information selected by the user thereon. As stated previously, the key pad 121 functions to input the key information selected by the user. A card inlet slot 43 is adapted to receive a user's card for the charged service. A print outlet slot 44 is adapted to issue the service receipt to the user. As mentioned above, the power switch 141 functions to turn on/off the AC power. Also in this drawing, there are provided the speaker SPK and the head phone HP.

Figure 4:
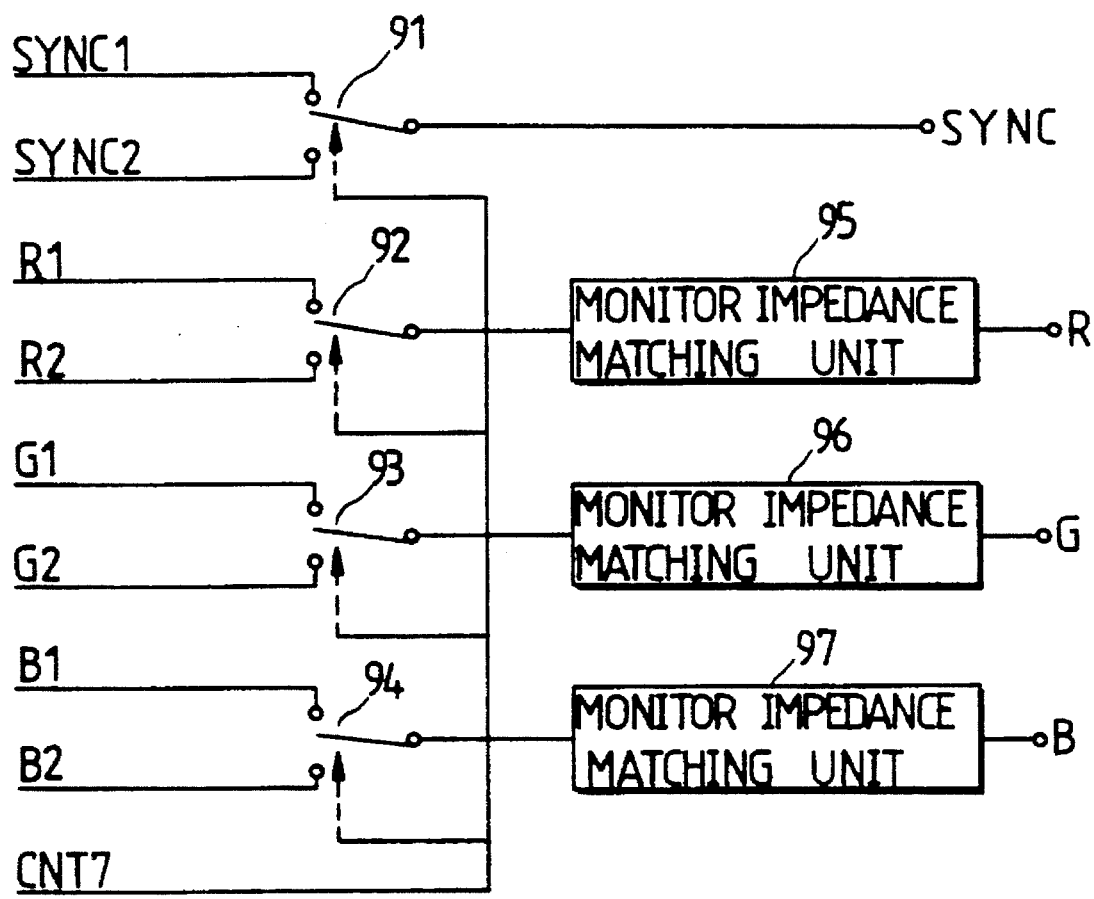
FIG. 4 is a detailed block diagram of a video signal switching circuit in FIG. 1.

Referring to FIG. 4, there is shown a detailed block diagram of the video signal switching circuit 90 in FIG. 1. As shown in this drawing, the video signal switching circuit 90 includes a switch 91 for selecting one of the synchronous signal SYNC2 from the video signal converter 72 and the synchronous signal SYNC1 from the CD video signal generator 101 in response to a video switching control signal CNT7 from the CPU 130 and outputting the selected synchronous signal to the color monitor MON, a switch 92 for selecting one of the red color signal R1 from the CD video signal generator 101 and the red color signal R2 from the video signal converter 72 in response to the video switching control signal CNT7 from the CPU 130, a switch 93 for selecting one of the green color signal G1 from the CD video signal generator 101 and the green color signal G2 from the video signal converter 72 in response to the video switching control signal CNT7 from the CPU 130, a switch 94 for selecting one of the blue color signal B1 from the CD video signal generator 101 and the blue color signal B2 from the video signal converter 72 in response to the video switching control signal CNT7 from the CPU 130, a monitor impedance matching unit 95 for matching an output impedance of the switch 92 with an input impedance of the color monitor MON, a monitor impedance matching unit 96 for matching an output impedance of the switch 93 with the input impedance of the color monitor MON, and a monitor impedance matching unit 97 for matching an output impedance of the switch 94 with the input impedance of the color monitor MON.

The operation of the multi-video/audio system with the above-mentioned construction in accordance with the present invention will hereinafter be described in detail.

When the power switch 141 is turned on, the system is initialized. The CPU 130 checks presence of a faulty state in the system through the clock generator 30 and sends the resultant message to the display screen 160. Then, the CPU 130 outputs guide information and a sound regarding basic video/audio services. The guide information from the CPU 130 is applied to the display screen 160. Upon receiving a key control signal CNT12 which the user applies through the key pad 121 to receive a desired service, the CPU 130 discriminates whether the desired service is charged or free.

If it is discriminated that the desired service is free, it is checked whether the desired service is a CD service. If it is checked that the desired service is the CD service, the CD controller 110 selects a CD containing information desired by the user and outputs the CD control signal CNT11 to the CPU 130. In response to the CD control signal CNT11 from the CD controller 110, the CPU 130 outputs the video control signal CNT8 and the audio control signal CNT9 to the CD video signal generator 101 and the CD audio signal generator 102 in the CD video/audio signal generation circuit 100, respectively. The CD audio signal generator 102 extracts the CD audio signal S5 from the audio data from the CD driver 112 read by the CPU 130 in response to the CD audio control signal CNT9 from the CPU 130 and outputs the extracted CD audio signal S5 to the audio signal amplifier 80. The audio signal amplifier 80 amplifies the CD audio signal from the CD audio signal generator 102 and outputs the amplified audio signal to the speaker SPK or the head phone HP in response to the volume/tone quality control signal S6 from the volume/tone quality controller 82 and the speaker/head phone switching signal S6' from the speaker/head phone switch 81.

The CD video signal generator 101 extracts the red, green and blue color signals R1, G1 and B1 and the synchronous signal SYNC1 from the video data from the CD driver 112 read by the CPU 130 in response to the CD video control signal CNT8 from the CPU 130. In the video signal switching circuit 90, the synchronous signal SYNC1 and the red, green and blue color signals R1, G1 and B1 from the CD video signal generator 101 are selected by the switches 91-94 in response to the video switching control signal CNT7 from the CPU 130, respectively. The selected synchronous signal SYNC1 from the switch 91 is directly applied to the color monitor MON. The selected red, green and blue color signals R1, G1 and B1 from the switches 92-94 are applied to the color monitor MON through the monitor impedance matching units 95-97 which match the output impedances of the switches 92-94 with the input impedance of the color monitor MON, respectively. As a result, the desired video information is displayed on the display screen 160 of the color monitor MON.

If it is checked that the desired service is a CATV service, the CPU 130 outputs the data modem control signal CNT4 to the data modem 50, thereby enabling the data modem 50 to apply the modem signal S1 to the network interface unit 60. In response to the network interface control signal CNT5 from the CPU 130, the network interface unit 60 receives the high frequency signal S2 of the various information regarding the free service from the data base connected to the CATV network and applies the received high frequency signal S2 to the multi-channel television tuner 71. In response to the tuner control signal CNT6 from the CPU 130, the multi-channel television tuner 71 receives the high frequency signal S2 from the network interface unit 60, selects one of the plurality of channels corresponding to the received high frequency signal S2 and generates the television video and audio signals S4 and S3 of the selected channel. The television audio signal S3 from the multi-channel television tuner 71 is applied to the audio signal amplifier 80. The audio signal amplifier 80 amplifies the television audio signal S3 from the multi-channel television tuner 71 and outputs the amplified audio signal to the speaker SPK or the head phone HP in response to the volume/tone quality control signal S6 from the volume/tone quality controller 82 and the speaker/head phone switching signal S6' from the speaker/head phone switch 81. The television video signal S4 from the multi-channel television tuner 71 is applied to the video signal converter 72.

The video signal converter 72 extracts the red, green and blue color signals R2, G2 and B2 and the synchronous signal SYNC2 from the television video signal S4 from the multi-channel television tuner 71 and outputs the extracted red, green and blue color signals R2, G2 and B2 and synchronous signal SYNC2 to the video signal switching circuit 90. In the video signal switching circuit 90, the synchronous signal SYNC2 and the red, green and blue color signals R2, G2 and B2 from the video signal converter 72 are selected by the switches 91–94 in response to the video switching control signal CNT7 from the CPU 130, respectively. The selected synchronous signal SYNC2 from the switch 91 is directly applied to the color monitor MON. The selected red, green and blue color signals R2, G2 and B2 from the switches 92–94 are applied to the color monitor MON through the monitor impedance matching units 95–97 which match the output impedances of the switches 92–94 with the input impedance of the color monitor MON, respectively. As a result, the desired video information is displayed on the display screen 160 of the color monitor MON.

On the other hand, if it is discriminated that the desired service is charged, it is checked whether the user inserts his card into the card inlet slot 43. If it is checked that the user inserts his card into the card inlet slot 43, the CPU 130 outputs the card reader control signal CNT2 to the card reader 41 in the card input/output unit 40, thereby enabling the card reader 41 to ascertain the card identification number, the card private number and the deposit balance of the user. The CPU 130 then outputs a memory control signal CNT1 to the memory unit 10, thereby enabling the memory unit 10 to store the ascertained information therein. Under this condition, the CPU 130 outputs the data modem control signal CNT4 and the network interface control signal CNT5 to the data modem 50 and the network interface unit 60, respectively, for the transmission and reception of the modem signal S1 between the data modem 50 and the data base connected to the CATV network through the network interface unit 60. At this time, the desired user information such as the card identification number, the card private number and the deposit balance of the user are placed on the modem signal S1.

In the case where the CD service is desired by the user, the CPU 130 compares the cost of a menu selected by the user with the deposit balance of the user to check whether the selected menu can be performed with the deposit balance of the user. When the deposit balance of the user is insufficient in accordance with the compared result, the CPU 130 sends the error message to the display screen 160. On the contrary, if the deposit balance of the user is sufficient in accordance with the compared result, the CPU 130 outputs the CD exchange control signal CNT10 to the CD exchange unit 111, thereby enabling the CD exchange unit 111 to select a CD containing information desired by the user. The selected CD is loaded into the CD driver 112. At this time, the CD driver interface unit 113 outputs the CD control signal CNT11 to the CPU 130. In response to the CD control signal CNT11 from the CD driver interface unit 113, the CPU 130 outputs the video control signal CNT8 and the audio control signal CNT9 to the CD video signal generator 101 and the CD audio signal generator 102 in the CD video/audio signal generation circuit 100, respectively. The CD audio signal generator 102 extracts the CD audio signal S5 from the audio data from the CD driver 112 read by the CPU 130 in response to the CD audio control signal CNT9 from the CPU 130 and outputs the extracted CD audio signal S5 to the audio signal amplifier 80. The audio signal amplifier 80 amplifies the CD audio signal from the CD audio signal generator 102 and outputs the amplified audio signal to the speaker SPK or the head phone HP in response to the volume/tone quality control signal S6 from the volume/tone quality controller 82 and the speaker/head phone switching signal S6' from the speaker/head phone switch 81.

The CD video signal generator 101 extracts the red, green and blue color signals R1, G1 and B1 and the synchronous signal SYNC1 from the video data from the CD driver 112 read by the CPU 130 in response to the CD video control signal CNT8 from the CPU 130. In the video signal switching circuit 90, the synchronous signal SYNC1 and the red, green and blue color signals R1, G1 and B1 from the CD video signal generator 101 are selected by the switches 91–94 in response to the video switching control signal CNT7 from the CPU 130, respectively. The selected synchronous signal SYNC1 from the switch 91 is directly applied to the color monitor MON. The selected red, green and blue color signals R1, G1 and B1 from the switches 92–94 are applied to the color monitor MON through the monitor impedance matching units 95–97 which match the output impedances of the switches 92–94 with the input impedance of the color monitor MON, respectively. As a result, the desired video information is displayed on the display screen 160 of the color monitor MON.

Upon completion of the CD service, the CPU 130 sends the accounting data regarding the used time of the selected service to the data base connected to the CATV network through the data modem 50 and the network interface unit 60. Also, the CPU 130 outputs the print control signal CNT3 to the printer 42, thereby enabling the printer 42 to issue the service receipt.

On the other hand, in the case where the CATV service is desired by the user, it is checked whether a menu selected by the user is a local service or a television service. If it is checked that the menu selected by the user is the local service, the corresponding local service information such as goods purchase, reservations and etc. is selected. If it is checked that the menu selected by the user is the television service, the corresponding television service channel is selected. Then, the CPU 130 compares the cost of the menu selected by the user with the deposit balance of the user to check whether the selected menu can be performed with the deposit balance of the user. When the deposit balance of the user is insufficient in accordance with the compared result, the CPU 130 sends the error message to the display screen 160. On the contrary, if the deposit balance of the user is sufficient in accordance with the compared result, the CPU 130 outputs the data modem control signal CNT4 and the network interface control signal CNT5 to the data modem 50 and the network interface unit 60, respectively, for the transmission and reception of the modem signal S1 between the data modem 50 and the data base connected to the CATV network through the network interface unit 60. At this time, various service information from the data base connected to the CATV network are transferred to the multi-channel television tuner 71 through the network interface unit 60, being placed on the high frequency signal S2.

In response to the tuner control signal CNT6 from the CPU 130, the multi-channel television tuner 71 receives the high frequency signal S2 from the network interface unit 60, selects one of the plurality of channels corresponding to the received high frequency signal S2 and generates the television video and audio signals S4 and S3 of the selected channel. The television audio signal S3 from the multi-channel television tuner 71 is applied to the audio signal amplifier 80. The audio signal amplifier 80 amplifies the television audio signal S3 from the multi-channel television tuner 71 and outputs the amplified audio signal to the speaker SPK or the head phone HP in response to the volume/tone quality control signal S6 from the volume/tone quality controller 82 and the speaker/head phone switching signal S6' from the speaker/head phone switch 81. The television video signal S4 from the multi-channel television tuner 71 is applied to the video signal converter 72.

The video signal converter 72 extracts the red, green and blue color signals R2, G2 and B2 and the synchronous signal SYNC2 from the television video signal S4 from the multi-channel television tuner 71 and outputs the extracted red, green and blue color signals R2, G2 and B2 and synchronous signal SYNC2 to the video signal switching circuit 90. In the video signal switching circuit 90, the synchronous signal SYNC2 and the red, green and blue color signals R2, G2 and B2 from the video signal converter 72 are selected by the switches 91–94 in response to the video switching control signal CNT7 from the CPU 130, respectively. The selected synchronous signal SYNC2 from the switch 91 is directly applied to the color monitor MON. The selected red, green and blue color signals R2, G2 and B2 from the switches 92–94 are applied to the color monitor MON through the monitor impedance matching units 95–97 which match the output impedances of the switches 92–94 with the input impedance of the color monitor MON, respectively. As a result, the desired video information is displayed on the display screen 160 of the color monitor MON.

Upon completion of the CATV service, the CPU 130 sends the accounting data regarding the used time of the selected service to the data base connected to the CATV network through the data modem 50 and the network interface unit 60. Also, the CPU 130 outputs the print control signal CNT3 to the printer 42, thereby enabling the printer 42 to issue the service receipt. Then, the operation returns to the step of outputting the guide information regarding the basic video/audio services.

The operation of the multi-video/audio system in accordance with the present invention will hereinafter be described in more detail with reference to FIG. 5 which is a flowchart illustrating a method of controlling the multi-video/audio system in accordance with the present invention.

When the power switch 141 is turned on, the system is initialized, the presence of a faulty state in the system is checked and the resultant message is displayed at the step A1. Then, the CPU 130 outputs the guide information and the sound regarding the basic video/audio services at the step A2. Upon receiving a key input signal which the user applies to receive a desired service at the step A3, the CPU 130 discriminates whether the desired service is charged or free at the step A4. If it is discriminated at the step A4 that the desired service is free, the corresponding service information is provided for the user at the step A5. It is checked at the step A6 whether the desired service is ended. If it is checked at the step A6 that the desired service is ended, the operation returns to the step A2 of outputting the guide information regarding the basic video/audio services. If it is checked at the step A6 that the desired service is not ended, the operation returns to the step A4 of discriminating whether the desired service is charged or free. The service information at the step A5 is the CD information contained in the system, or the free service information or CATV broadcasting from the CATV network.

If it is discriminated at the step A4 that the desired service is charged, the user's card is read by the card reader 41 at the step A7. Then, at the step A8, the data modem 50 and the CATV network are interfaced through the network interface unit 60 to transmit and receive the modem signal to/from the data base connected to the CATV network. As a result, the card identification number, the card private number and the deposit balance of the user are ascertained at the steps A9 and A10. It is checked at the step A11 whether the desired service is the CD service. If it is checked at the step A11 that the desired service is the CD service, the corresponding operation is performed at the step A12. If it is checked at the step A11 that the desired service is not the CD service, it is checked at the step A13 whether the desired service is the CATV service. If it is checked at the step A13 that the desired service is the CATV service, the corresponding operation is performed at the step A14. If it is checked at the step A13 that the desired service is not the CATV service, the operation returns to the step A3 of receiving the key input signal.

Figure 5:
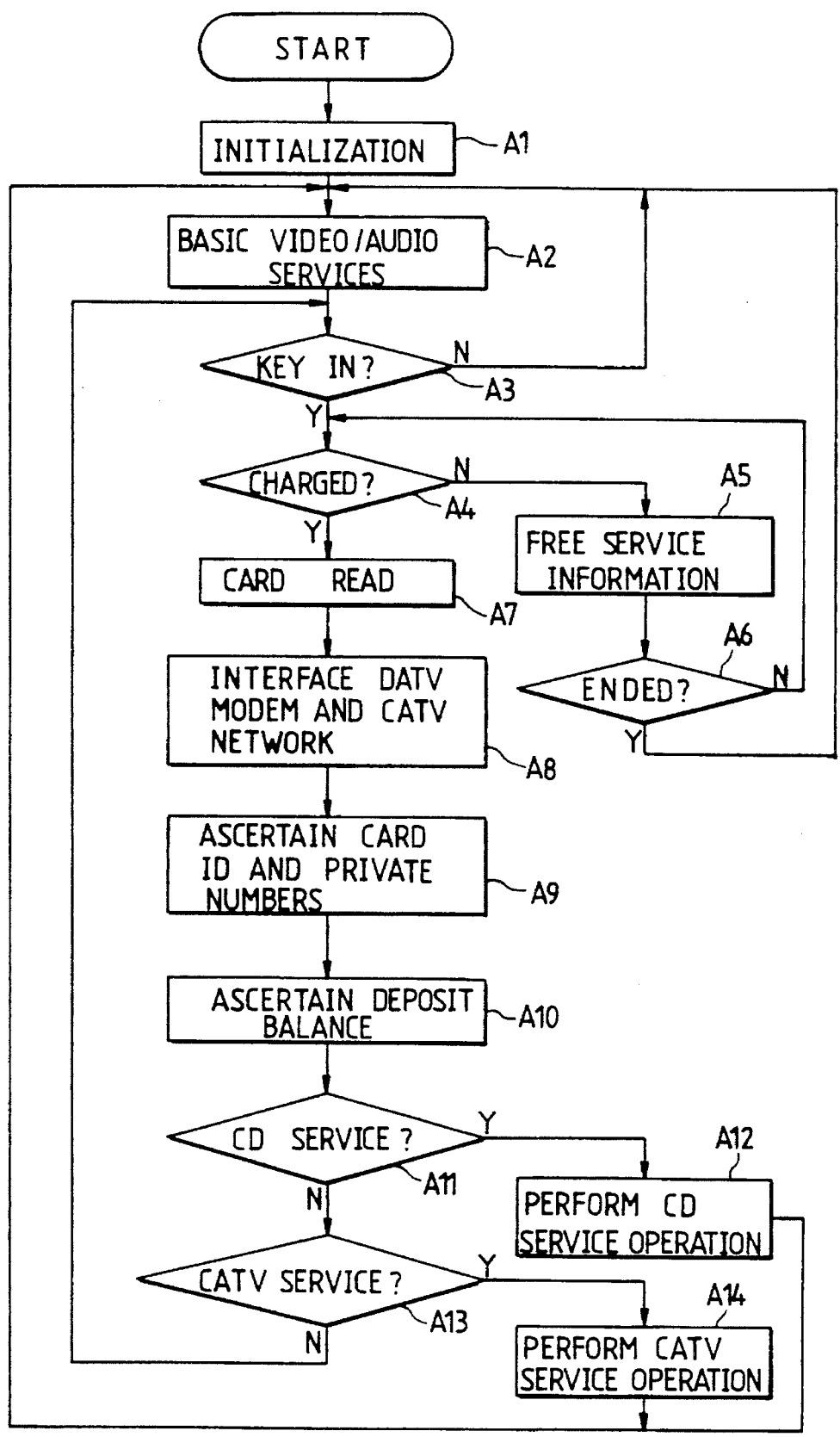
FIG. 5 is a flowchart illustrating a method of controlling the multi-video/audio system in accordance with the present invention.
Figure 6:
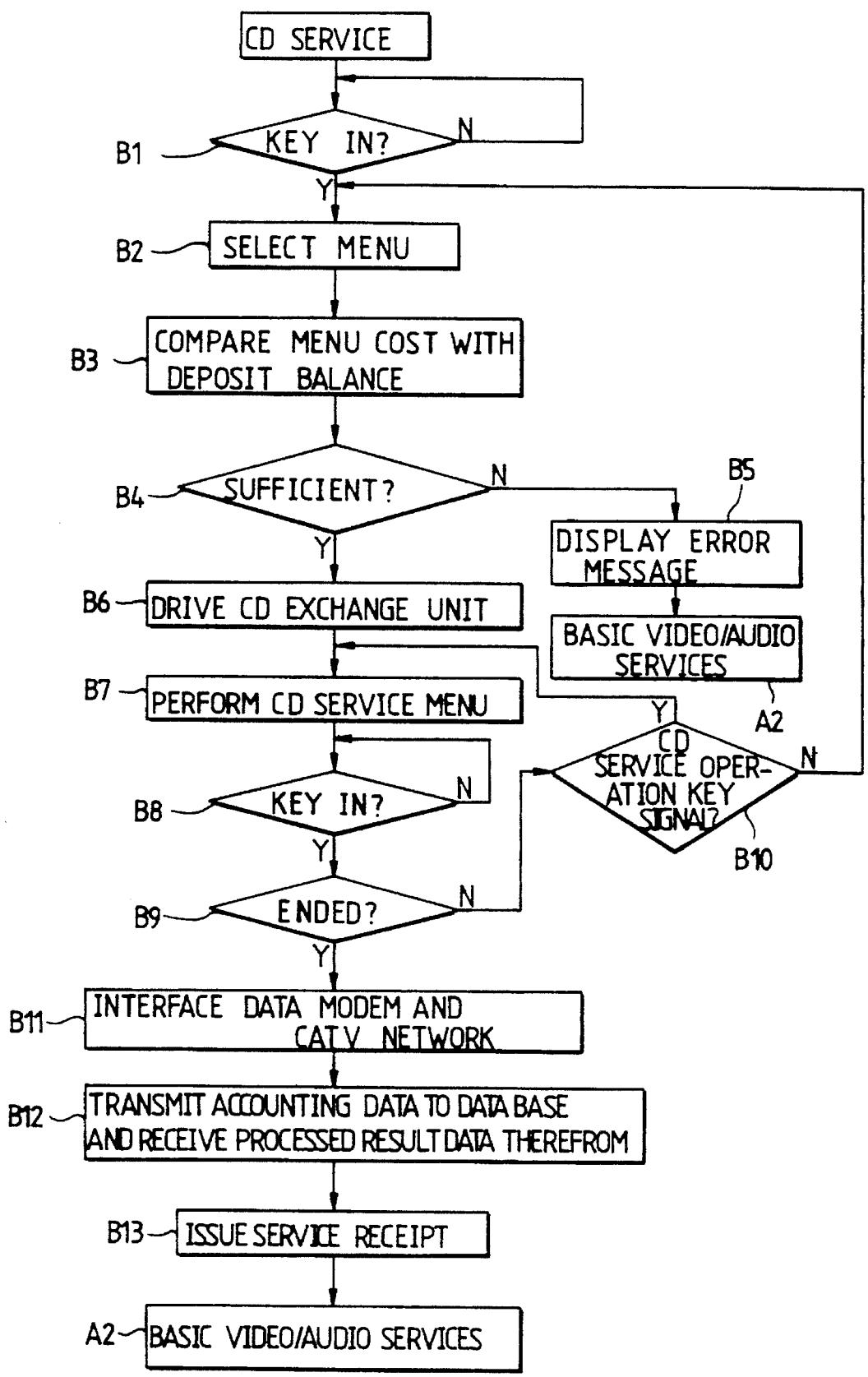
FIG. 6 is a flowchart illustrating a compact disk service routine of the method in FIG. 5.

FIG. 6 is a flowchart illustrating the CD service routine A12 of the method in FIG. 5. First, the user applies a key input signal at the step B1 to select a desired CD service menu on the screen at the step B2. The CPU 130 compares the cost of the selected menu with the deposit balance of the user to check whether the selected menu can be performed with the deposit balance of the user, at the step B3. When the deposit balance of the user is insufficient in accordance with the compared result at the step B4, the error message is displayed at the step B5 and the operation returns to the step A2 of outputting the guide information regarding the basic video/audio services. On the contrary, if the deposit balance of the user is sufficient in accordance with the compared result at the step B4, the CPU 130 drives the CD exchange unit 111 at the step B6 to perform the desired CD service menu at the step B7. It is checked at the step B8 whether another key input signal is present. If it is checked at the step B8 that another key input signal is present, it is checked at the step B9 whether the key input signal is an end key signal. If it is checked at the step B9 that the key input signal is not the end key signal, it is checked at the step B10 whether the key input signal is a CD service operation key signal. If it is checked at the step B10 that the key input signal is the CD service operation key signal, the operation returns to the step B7 of performing the desired CD service menu. If it is checked at the step B10 that the key input signal is not the CD service operation key signal, the operation returns to the step B2 of selecting the desired CD service menu on the screen.

On the other hand, if it is checked at the step B9 that the key input signal is the end key signal, the data modem 50 and the CATV network are interfaced through the network interface unit 60 at the step B11 to transmit the accounting data regarding the used time of the desired CD service menu to the data base connected to the CATV network and receive the processed result data from the data base at the step B12. The service receipt is issued from the printer 42 on the basis of the processed result data from the data base at the step B13. Then, the operation returns to the step A2 of outputting the guide information regarding the basic video/audio services.

Figure 7:
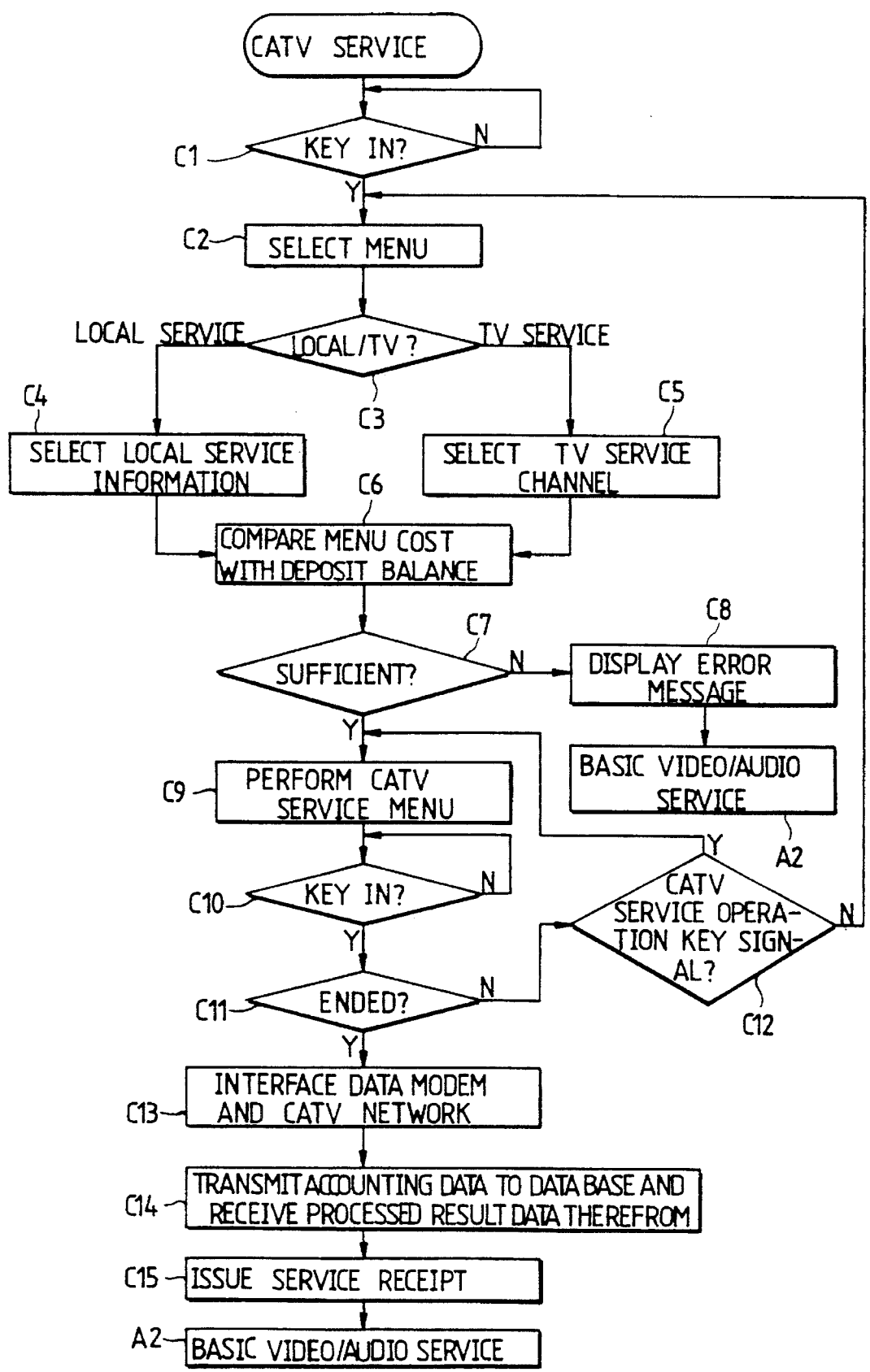
FIG. 7 is a flowchart illustrating a CATV service routine of the method in FIG. 5.

FIG. 7 is a flowchart illustrating the CATV service routine A14 of the method in FIG. 5. First, the user applies a key input signal at the step C1 to select a desired CATV service menu on the screen at the step C2. It is checked at the step C3 whether the menu selected by the user is a local service or a television service. If it is checked at the step C3 that the menu selected by the user is the local service, the corresponding local service information is selected at the step C4. If it is checked at the step C3 that the menu selected by the user is the television service, the corresponding television service channel is selected at the step C5. Then, the CPU 130 compares the cost of the menu selected by the user with the deposit balance of the user to check whether the selected menu can be performed with the deposit balance of the user, at the step C6. When the deposit balance of the user is insufficient in accordance with the compared result at the step C6, the error message is displayed at the step C8 and the operation returns to the step A2 of outputting the guide information regarding the basic video/audio services. On the contrary, if the deposit balance of the user is sufficient in accordance with the compared result at the step C6, the desired CATV service menu is performed at the step C9. The CATV service menu is generally classified into the local service and the television service. The local service is for providing the user with the information service from the data base such as goods purchase, reservations and etc.. The television service is for providing the user with various charged broadcasting programs from CATV broadcasting stations connected to the CATV network.

It is checked at the step C10 whether another key input signal is present. If it is checked at the step C10 that another key input signal is present, it is checked at the step C11 whether the key input signal is an end key signal. If it is checked at the step C11 that the key input signal is not the end key signal, it is checked at the step C12 whether the key input signal is a CATV service operation key signal. If it is checked at the step C12 that the key input signal is the CATV service operation key signal, the operation returns to the step C9 of performing the desired CATV service menu. If it is checked at the step C12 that the key input signal is not the CATV service operation key signal, the operation returns to the step C2 of selecting the desired CATV service menu on the screen. On the other hand, if it is checked at the step C11 that the key input signal is the end key signal, the data modem 50 and the CATV network are interfaced through the network interface unit 60 at the step C13 to transmit the accounting data regarding the used time of the desired CATV service menu to the data base connected to the CATV network and receive the processed result data from the data base at the step C14. The service receipt is issued from the printer 42 on the basis of the processed result data from the data base at the step C15. Then, the operation returns to the step A2 of outputting the guide information regarding the basic video/audio services.

As apparent from the above description, according to the present invention, various information such as a motion picture, a photograph and etc. can be provided from the data base by utilizing the CATV network, breaking from the conventional simple data information transfer manner depending on the digital information. Therefore, the present invention can be applied to department stores, transport terminals, information supply centers and etc. to provide a desired service for the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a multi-video/audio system, comprising the steps of:

(a) initializing the system when a power switch is turned on;

(b) outputting guide information and a sound regarding basic video/audio services;

(c) discriminating whether a service desired by the user is charged or free;

(d) providing information corresponding to a free service for the user if it is discriminated at said step (c) that the desired service is free and then checking whether the user continues to desire a service if the present service is ended;

(e) reading a user's card through a card reader if it is discriminated at said step (c) that the desired service is charged and interfacing a data modem and a cable television network through a network interface unit to transmit and receive a modem signal to/from a data base connected to the cable television network, so as to ascertain a card identification number, a card private number and deposit balance of the user;

(f) checking whether the charged service is a compact disk service;

(g) performing a compact disk service operation if it is checked at said step (f) that the charged service is the compact disk service;

(h) checking whether the charged service is a cable television service if it is checked at said step (f) that the charged service is not the compact disk service; and (i) performing a cable television service operation if it is checked at said step (h) that the charged service is the cable television service.

2. A method of controlling a multi-video/audio system, as set forth in claim 1, wherein said step (g) of performing the compact disk service operation includes the steps of:

(g-1) allowing the user to select a desired compact disk service menu on a screen;

(g-2) comparing the cost of the selected compact disk service menu with the deposit balance of the user to check whether the selected compact disk service menu can be performed with the deposit balance of the user, displaying an error message and returning to said step (b) of outputting the guide information regarding the basic video/audio services, if the deposit balance of the user is insufficient in accordance with the compared result, and driving a compact disk exchange unit to perform the desired compact disk service menu, if the deposit balance of the user is sufficient in accordance with the compared result; and (g-3) checking whether a key input signal is present, checking whether the key input signal is an end key signal if it is checked that the key input signal is present, checking whether the key input signal is a compact disk service operation key signal if it is checked that the key input signal is not the end key signal, returning to said step (g-2) of performing the desired compact disk service menu, if it is checked that the key input signal is the compact disk service operation key signal, returning to said step (g-1) of allowing the user to select the desired compact disk service menu on the screen, if it is checked that the key input signal is not the compact disk service operation key signal, and interfacing said data modem and said cable television network through said network interface unit to transmit accounting data regarding the used time of the desired compact disk service menu to said data base connected to said cable television network and receive the processed result data from said data base, issuing a service receipt through a printer on the basis of the processed result data from said data base and returning to said step (b) of outputting the guide information regarding the basic video/audio services, if it is checked that the key input signal is the end key signal.

3. A method of controlling a multi-video/audio system, as set forth in claim 2, wherein said compact disk exchange unit is adapted to exchange a compact disk with one containing information desired by the user.

4. A method of controlling a multi-video/audio system, as set forth in claim 1, wherein said step (i) of performing the cable television service operation includes the steps of:

(i-1) allowing the user to select a desired cable television service menu on a screen, checking whether the cable television service menu selected by the user is a local service or a television service, selecting local service information if it is checked that the cable television service menu selected by the user is the local service and selecting a television service channel if it is checked that the cable television service menu selected by the user is the television service;

(i-2) comparing the cost of the selected cable television service menu with the deposit balance of the user to check whether the selected cable television service menu can be performed with the deposit balance of the user, displaying an error message and returning to said step (b) of outputting the guide information regarding the basic video/audio services, if the deposit balance of the user is insufficient in accordance with the compared result, and performing the desired cable television service menu, if the deposit balance of the user is sufficient in accordance with the compared result; and (i-3) checking whether a key input signal is present, checking whether the key input signal is an end key signal if it is checked that the key input signal is present, checking whether the key input signal is a cable television service operation key signal if it is checked that the key input signal is not the end key signal, returning to said step (i-2) of performing the desired cable television service menu, if it is checked that the key input signal is the cable television service operation key signal, returning to said step (i-1) of allowing the user to select the desired cable television service menu on the screen, if it is checked that the key input signal is not the cable television service operation key signal, and interfacing said data modem and said cable television network through said network interface unit to transmit accounting data regarding the used time of the desired cable television service menu to said data base connected to said cable television network and receive the processed result data from said data base, issuing a service receipt through a printer on the basis of the processed result data from said data base and returning to said step (b) of outputting the guide information regarding the basic video/audio services, if it is checked that the key input signal is the end key signal.

5. A method of controlling a multi-video/audio system, as set forth in claim 11, wherein said step (i-2) of performing the desired cable television service menu provides the user with an information service from said data base such as goods purchase, reservations and etc. if the desired cable television service menu is the local service and provides the user with various charged broadcasting programs from cable television broadcasting stations connected to said cable television network if the desired cable television service menu is the television service.

6. A multi-video/audio system comprising:

system control means for controlling the entire operation of the system;

memory means for storing system information necessary to the operation of said system control means, accounting data, a terminal identification number and time;

clock generation means for generating a clock signal to said system control means;

battery backup means for supplying auxiliary power to said memory means and said clock generation means when the supply of main power thereto is blocked, so that said memory means and said clock generation means can maintain their original functions;

card input/output means for ascertaining a card identification number, a card private number and deposit balance of the user in response to a card reader control signal from said system control means and issuing a service receipt in response to a print control signal from said system control means for a charged service;

data modem means for transmitting/receiving a modem signal of various data information to/from a data base connected to a cable television network in response to a data modem control signal from said system control means;

network interface means for performing an interfacing operation between said data modem means and said cable television network in response to a network interface control signal from said system control means;

television video/audio signal generation means for receiving a high frequency signal from said cable television network through said network interface means, selecting one of a plurality of channels corresponding to the received high frequency signal, generating television video and audio signals of the selected channel and separating the generated television video signal into red, green and blue color signals and a synchronous signal to be used in a general color monitor;

audio signal amplification means for amplifying one of the television audio signal from said television video/audio signal generation means and a compact disk audio signal and outputting the amplified audio signal to a speaker or a head phone in response to a volume/tone quality control signal and a speaker/head phone switching signal;

compact disk control means for exchanging a compact disk with another one in response to a compact disk exchange control signal from said system control means, loading the exchanged compact disk and outputting a compact disk control signal to said system control means;

compact disk video/audio signal generation means for extracting red, green and blue color signals and a synchronous signal from video data from said compact disk control means read by said system control means in response to a compact disk video control signal from said system control means, extracting the compact disk audio signal from audio data from said compact disk control means read by said system control means in response to a compact disk audio control signal from said system control means and outputting the extracted compact disk audio signal to said audio signal amplification means;

video signal switching means for selectively outputting the red, green and blue color signals and the synchronous signal from said television video/audio signal generation means and the red, green and blue color signals and the synchronous signal from said compact disk video/audio signal generation means to the color monitor;

key input means including a key pad for inputting key information selected by the user and a key interface unit for transferring the key information inputted by said key pad to said system control means; and power supply means including a power switch for turning on/off alternating current power and a direct current power supply for receiving the alternating current power through said power switch and supplying direct current power as the main power to said components in the system.

7. A multi-video/audio system as set forth in claim 6, wherein said card input/output means includes:

a card reader for ascertaining the card identification number, the card private number and the deposit balance of the user in response to the card reader control signal from said control means; and a printer for issuing the service receipt in response to the print control signal from said control means.

8. A multi-video/audio system as set forth in claim 6, wherein said data modem means is the same in construction as a high frequency data modem used in said cable television network to enable an interactive service between the user and said data base or a cable television broadcasting station.

9. A multi-video/audio system as set forth in claim 6, wherein said television video/audio signal generation means includes:

a multi-channel television tuner responsive to a tuner control signal from said system control means for receiving the high frequency signal from said cable television network through said network interface means, selecting one of the plurality of channels corresponding to the received high frequency signal, generating the television video and audio signals of the selected channel and outputting the generated television audio signal to said audio signal amplification means; and a video signal converter for separating the generated television video signal from said multi-channel television tuner into the red, green and blue color signals and the synchronous signal to be used in the general color monitor and outputting the separated red, green and blue color signals and synchronous signal to said video signal switching means.

10. A multi-video/audio system as set forth in claim 6, wherein said compact disk control means includes:

a compact disk exchange unit for exchanging the compact disk with another one in response to the compact disk exchange control signal from said system control means;

a compact disk driver for loading the exchanged compact disk in response to an output signal from said compact disk exchange unit; and a compact disk driver interface unit for outputting the compact disk control signal to said system control means in response to an output signal from said compact disk driver; and wherein said compact disk video/audio signal generation means includes:

a compact disk video signal generator for extracting the red, green and blue color signals and the synchronous signal from the video data from said compact disk driver read by said system control means in response to the compact disk video control signal from said system control means and outputting the extracted red, green and blue color signals and synchronous signal to said video signal switching means; and a compact disk audio signal generator for extracting the compact disk audio signal from the audio data from said compact disk driver read by said system control means in response to the compact disk audio control signal from said system control means and outputting the extracted compact disk audio signal to said audio signal amplification means.

11. A multi-video/audio system as set forth in claim 6, wherein said video signal switching means includes:

first to fourth switches for selecting the synchronous signal and the red, green and blue color signals from said television video/audio signal generation means or the synchronous signal and the red, green and blue color signals from said compact disk video/audio signal generation means in response to a video switching control signal from said system control means, respectively;

first to third monitor impedance matching units for matching output impedances of said second to fourth switches with an input impedance of the color monitor, respectively.

12. A multi-video/audio system as set forth in claim 6, wherein said speaker and said head phone are connected to said audio signal amplification means to be selectable by the user to provide an audio information service for the user.

* * * * *